United States Patent
Dismukes et al.

(10) Patent No.: US 10,676,833 B2
(45) Date of Patent: *Jun. 9, 2020

(54) NICKEL PHOSPHIDE CATALYSTS FOR DIRECT ELECTROCHEMICAL $CO_2$ REDUCTION TO HYDROCARBONS

(71) Applicant: Rutgers, The State University of New Jersey, New Brunswick, NJ (US)

(72) Inventors: G. Charles Dismukes, Princeton, NJ (US); Anders Laursen, New York, NY (US); Martha Greenblatt, Highland Park, NJ (US); Karin Calvinho, New Brunswick, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/765,896

(22) PCT Filed: Oct. 7, 2016

(86) PCT No.: PCT/US2016/056026
§ 371 (c)(1),
(2) Date: Apr. 4, 2018

(87) PCT Pub. No.: WO2017/062788
PCT Pub. Date: Apr. 13, 2017

(65) Prior Publication Data
US 2018/0282885 A1    Oct. 4, 2018

Related U.S. Application Data

(60) Provisional application No. 62/239,389, filed on Oct. 9, 2015.

(51) Int. Cl.
| | | |
|---|---|---|
| *C25B 11/04* | (2006.01) | |
| *C25D 17/10* | (2006.01) | |
| *C25B 3/04* | (2006.01) | |
| *B01J 27/185* | (2006.01) | |
| *B01J 35/02* | (2006.01) | |
| *C25B 9/10* | (2006.01) | |
| *B01J 21/06* | (2006.01) | |
| *B01J 35/00* | (2006.01) | |

(52) U.S. Cl.
CPC ......... *C25B 11/0478* (2013.01); *B01J 21/063* (2013.01); *B01J 27/1853* (2013.01); *B01J 35/0033* (2013.01); *B01J 35/023* (2013.01); *C25B 3/04* (2013.01); *C25B 9/10* (2013.01); *C25B 11/04* (2013.01); *C25B 11/041* (2013.01); *C25B 11/0405* (2013.01); *C25B 11/0426* (2013.01); *C25B 11/0447* (2013.01); *C25D 17/10* (2013.01)

(58) Field of Classification Search
CPC ......... C25B 11/0478; C25B 3/04; C25B 9/10; C25B 11/04; C25B 11/0405; C25B 11/041; C25B 11/0426; C25B 11/0447; B01J 21/063; B01J 27/1853; B01J 35/0033; B01J 35/023; C25D 17/10
See application file for complete search history.

(56) References Cited

U.S. PATENT DOCUMENTS

| | | | |
|---|---|---|---|
| 8,845,878 B2 | 9/2014 | Cole et al. | |
| 9,350,011 B2 | 5/2016 | Sakaguchi et al. | |
| 10,358,727 B2 * | 7/2019 | Dismukes | ................. C25B 1/04 |
| 2013/0178360 A1 * | 7/2013 | Lewis | ................. H01M 4/9091 |
| | | | 502/315 |
| 2014/0027303 A1 | 1/2014 | Cole et al. | |

FOREIGN PATENT DOCUMENTS

WO    20150102618 A1    7/2015

OTHER PUBLICATIONS

Pu et al (Ni2P nanoparticle films supported on a Ti plate as an efficient hydrogen evolution cathode, Nanoscale, 2014, 6, pp. 11031-11034). (Year: 2014).*

Zhang, et al: "Competition Between CO2 Reduction and H2 Evolution on Transition-Metal Electrocatalysts", ACS Catalysis, 2014, vol. 4, pp. 3742-3748.

Gasque, et al: "The Catalysis of CO2 Electroreduction and Related Processes", Department of Physics, Technical University of Denmark, 2013, pp. 1-202.

* cited by examiner

*Primary Examiner* — Melvin C. Mayes
*Assistant Examiner* — Michael Forrest
(74) *Attorney, Agent, or Firm* — Fox Rothschild LLP (57) ABSTRACT

Disclosed are cathodes comprising a conductive support substrate having a catalyst coating containing nickel phosphide nanoparticles. The conductive support substrate is capable of incorporating a material to be reduced, such as $CO_2$ or CO. Also disclosed are electrochemical methods for generating hydrocarbon and/or carbohydrate products from $CO_2$ or CO using water as a source of hydrogen.

18 Claims, 6 Drawing Sheets

NICKEL PHOSPHIDE CATALYSTS FOR DIRECT ELECTROCHEMICAL CO$_2$ REDUCTION TO HYDROCARBONS

CROSS REFERENCE TO RELATED APPLICATIONS

This application claims the benefit of priority pursuant to 35 U.S.C. § 119(e) of U.S. Provisional Patent Application No. 62/239,389, filed on Oct. 9, 2015, the disclosure of which is incorporated herein by reference in its entirety.

FIELD OF INVENTION

The present invention relates to a novel nickel phosphide electrocatalyst for the direct electrochemical reduction of carbon dioxide and/or carbon monoxide to hydrocarbons.

BACKGROUND

Dwindling conventional fossil resources are amongst the greatest global challenges currently being faced, and this has rightly spurred ever increasing research efforts into new utilizations of renewable energy resources. The intermittent nature of most renewable energy sources (e.g. solar and wind) entails a need for energy storage. Energy can be stored safely and conveniently as chemical bonds. Methane reduced from CO$_2$ is one such possible energy carrier. This energy carrier could then be introduced in a closed loop cycle, with recovery of the spent carrier (CO$_2$) from the atmosphere making the technology carbon neutral—provided a renewable energy source such as sunlight or wind is used to drive the process. Furthermore, the recent utilization of fossil natural gas resources in the US has spurred a large investment in industries relying on cheap natural gas. Renewable methane production from CO$_2$ reduction would support this industry beyond the lifetime of the current fossil resources and thus gradually increase the market for these new technologies.

Electrochemical CO$_2$ reduction (Direct CO$_2$ Reduction Reaction, DCRR) has been realized to alcohols on noble metals, and to alkanes on Cu. These technologies are still severely limited from making a significant impact by at least the following: significant H$_2$ production (by-product) as well as high cost for the noble metals and low selectivity for a single alkane/alkene product for Cu. Of further complication, a small 110 mV thermodynamic difference separates CO$_2$ reduction to CO (a key intermediate) vs. proton reduction to H$_2$. This class of catalysts performs this reaction at lower potentials, i.e. higher efficiencies than any previous flat pure metal electrodes. While it might seem reasonable to propose to use the worst H$_2$ evolution catalysts available (e.g., SnO$_2$), reduction of CO to valuable hydrogenated products requires a catalyst that is capable of showing some measure of activity towards the reduction of protons (hydrogen cations). Understanding and controlling this apparent paradox is key to achieving selective DCRR catalysts.

Thus, improved and more efficient DCRR catalysts are eagerly sought.

SUMMARY OF THE INVENTION

Improved and more efficient catalysts and methods for DCRR are provided by the present invention.

One aspect of the invention is directed to a cathode comprising a conductive support substrate and a catalyst coating, where the catalyst coating comprises nanoparticles of Ni$_x$P$_y$ (also referred to herein as "Ni—P"), where x and y represent integers such that the compounds are selected from the group consisting of Ni$_3$P, Ni$_5$P$_2$, Ni$_{12}$P$_5$, Ni$_2$P, Ni$_5$P$_4$, NiP$_2$, and NiP$_3$.

Another aspect of the invention is directed to a cathode comprising a conductive support substrate and a catalyst coating, the catalyst coating comprising nanoparticles of an alloy of one or more of the above Ni$_x$P$_y$ compounds and Fe$_2$P, where the alloy has a Ni—P:Fe$_2$P ratio of between 100:0 to 0:100 wt %, and preferably between about 99:1 and 1:99 wt %. In one embodiment, the Ni—P compound is Ni$_2$P.

In one embodiment of the above cathodes, the catalyst nanoparticles have grain sizes in the range from about 5 to about 5000 nm. In one embodiment the conductive support substrate further incorporates a material to be reduced, where the catalyst coating catalytically interacts with the material to be reduced incorporated into the conductive support substrate. In one embodiment the cathode material to be reduced comprises carbon dioxide and/or carbon monoxide.

In some embodiments the conductive support substrate of the above cathodes comprises hydrophobic regions and hydrophilic regions to aid in adsorption of carbon dioxide and/or carbon monoxide from gas or aqueous phase to achieve separation from water molecules, where at least some of the catalyst nanoparticles are in the hydrophobic regions of the conductive support substrate and catalytically interact with the carbon dioxide and/or carbon monoxide by electrical reduction to produce hydrocarbon products, [CH$_n$]$_m$ or carbohydrate products, [CH$_n$O]$_m$, where n and m are integers. For purposes of the present application, hydrocarbon products, [CH$_n$]$_m$ and carbohydrate products, [CH$_n$O]$_m$ are not intended to represent exact stoichiometries, and instead represent saturated and unsaturated compounds containing only carbon and hydrogen, and saturated and unsaturated compounds containing carbon, hydrogen and oxygen, including, alcohols, carboxylic acids and acid anhydrides. In one embodiment the conductive support substrate is an ionomer or conducting polymer.

A further aspect of the invention is directed to a method for generating hydrocarbon products from water, and carbon dioxide and/or carbon monoxide via an electrolysis reaction, comprising the steps of: (a) placing a catalyst-coated cathode according to the present invention in an electrolyte together with an anode; (b) placing the anode and cathode in conductive contact with an external source of electricity; (c) providing a source of carbon dioxide and/or carbon monoxide to the cathode; and (d) using the external source of electricity to drive an electrolysis reaction at the cathode, where hydrocarbon products, [CH$_n$]$_m$ or carbohydrate products, [CH$_n$O]$_m$, or both, are generated from the carbon dioxide and/or carbon monoxide, and where n and m are integers.

Another aspect of the invention is directed to a method for reduction of carbon dioxide to hydrocarbons comprising: (a) placing a catalyst-coated cathode according to the present invention in an electrolyte together with an anode; (b) placing the anode and cathode in conductive contact with an external source of electricity; (c) providing a source of carbon dioxide to the cathode; and (d) using the external source of electricity to drive an electrolysis reaction at the cathode, where hydrocarbon products, [CH$_n$]$_m$, or carbohydrate product, [CH$_n$O]$_m$ products, or both, are generated from the carbon dioxide, and where n and m are integers.

DETAILED DESCRIPTION OF THE INVENTION

The presently disclosed technology is directed to a natural gas fuel/energy carrier which can readily be handled by existing transport and export facilities. This would alleviate a significant efficiency loss and ensure continued cheap natural gas from renewable resources for future generations.

The possibility of generating renewable fuels from the reduction of gaseous $CO_2$ into liquid fuels such as methanol, higher alcohols or hydrocarbons using renewable energy is the most direct route to a sustainable energy society. $CO_2$ reduction may be carried out by direct electrolysis at room temperature, but at least 4 electrons ($e^-$) are needed to form valuable fuels (eqs. 2-6). From the listed potentials it becomes evident that $CO_2$ reduction occurs in thermodynamic competition with the more simple 2 $e^-$ hydrogen evolution reaction (HER) (U=0 V vs. RHE at 1 atm. $H_2$).

$$CO_2 + H_2O + 2e^- \leftrightarrows CO + 2OH^- (U = -0.11 \text{ V vs. RHE}) \quad (2)$$

$$CO_2 + 5H_2O + 6e^- \leftrightarrows CH_3OH + 6OH^- (U = 0.03 \text{ V vs. RHE}) \quad (3)$$

$$CO_2 + 6H_2O + 8e^- \leftrightarrows CH_4 + 8OH^- (U = 0.16 \text{ V vs. RHE}) \quad (4)$$

$$2CO_2 + 8H_2O + 12e^- \leftrightarrows C_2H_4 + 12OH^- (U = 0.07 \text{ V vs. RHE}) \quad (5)$$

$$CO_2 + H_2O + 2e^- \leftrightarrows HCOO^- + OH^- (U = 0V \text{ vs. RHE}) \quad (6)$$

Therefore the challenge is to produce a catalyst which preferentially provides H-atom equivalents to reduce $CO_2$ rather than $H^+$. For this reason, DCRR has often been performed in neutral pH where the proton concentration at the catalyst surface is low.

This has been previously demonstrated experimentally on single component transition metal catalysts, with the best selectivity for the production of alkanes from $CO_2$ reduction on Cu electrodes occurring in low ionic strength electrolytes (0.1 M $KHCO_3$, pH 6.8). Such results indicate selectivity towards hydrocarbons of 72.3% ($CH_4$ was the major product) achieved at −1.04V vs. the reversible hydrogen electrode ("RHE"), which is ~1.2 V more negative than the thermodynamic limit of +0.16V vs. RHE. However, such an immense over-potential greatly impedes the applicability of this approach to the production of synthetic fuels, but nonetheless remains the best performing single component transition metal DCRR catalyst to date.

Although not wishing to be bound by any particular theory, it is believed that the mechanism of $CO_2$ reduction, at least on Cu, is as follows. As the potential is decreased from the reversible HER potential (−0.401 V vs. normal hydrogen electrode (NHE) under these conditions) $H_2$ is the major product until (−0.8 V). As the potential is further decreased the fraction of $H_2$ reduces as CO (−0.8 V) and then $HCOO^-$ (−0.9 V) are formed. Hori and co-workers thus concluded that CO is likely the first intermediate of $CO_2$ reduction. The appearance of $C_2H_4$ and $CH_4$ at more negative potentials further correlates with a decrease in CO and $HCOO^-$. Additional studies indicate that mechanism involves the reduction of $CO_2$ to CO, which poisons the surface sites for the HER. CO then reduces to HCO, which binds parallel to the Cu surface. The potential energy for the reduction of CO to HCO is uphill in energy until an applied potential of −0.74 V vs. RHE (−1.14V vs. NHE). This is predicted to be the rate limiting step for the overall process, and closely corresponds to the potential observed by others for the evolution of hydrocarbons.

With the proposed rate limiting step of CO to HCO, the calculated CO binding energy for several metal surfaces could be obtained, and the resulting plot finds Cu as the peak of a volcano-type curve, with minimal binding energy for CO, potentially rationalizing its current standing as the optimal surface for $CO_2$ reduction. The second reason is the poisoning of the Cu sites from performing the HER by the binding CO.

It has now been discovered that in order to design a better catalyst, one must "break" the scaling relation between CO and HCO binding to the catalyst surface. This could be done, for example, by devising strategies to bend the CO molecule from perpendicular binding to a coordination allowing for hydrogenation of the C-atom. A Lewis acid group in the proximity of the active site therefore should aid in the reduction of the CO to CHO by binding to the oxygen of the CO to pull it out of the perpendicular binding geometry to the metal.

It has recently been shown that a Cu-oxide derived Cu electrode shows improved activity for the reduction of CO to hydrocarbons (and alcohols) at a lowered overpotential of −0.4V vs. RHE. It was proposed that the high number of grain boundaries in these electrodes increases the reactivity towards CO reduction, with the CO molecule becoming distorted when binding at a grain boundary. Thus for the active binary catalyst compounds of the present invention, reactivity could be further increased by increasing the number of grain boundaries, for instance by agglomerating individual nanoparticles (vide infra).

A viable technology to produce fuels from $CO_2$ must quantitatively compare to industrial procedures. Currently, industrial methanol production from CO is estimated at 51% energy efficiency. The theoretical maximum energy efficiency for DCRR—assuming 0V over-potential and complete recovery of products—is 73%, indicating that DCRR is a technology theoretically capable of significantly outperforming the current industrial standard. Efficiency for the electrochemical reduction of $CO_2$ to $CH_4$ is currently 13% on Cu surfaces assuming oxygen evolution is the side-reaction.

Also, the archetypical DCRR Cu catalyst produces significant quantities of poisonous CO. CO is an energy rich molecule that is a key intermediate in the proposed DCRR mechanism (vide supra), however, it is also an odorless toxic gas which requires specialized and expensive handling. It is thus of significant importance to design catalysts such that CO is avoided as a liberated product altogether.

Replacing catalysts (electrodes) is expensive down-time for any commercial process, hence it is critical to maintain extended life-times of excellent catalyst performance. There is currently no example of test exceeding 2 hrs DCRR on transition metal electrodes. The catalysts of the invention target at least 5 hours of continuous activity. Industrial application requires significantly longer stabilities than hours. For example, industrial anodes for the chlor-alkali process (based on $RuO_x$ and $IrO_x$) have lifetimes of about 7 years.

$Ni_5P_4$, $Ni_2P$ and $Ni_{12}P_5$ have now been synthesized as flat surfaces for the inventive family of direct $CO_2$ reduction catalysts. This allows the direct observation of catalytic activity on the most stable crystal termination and directly comparable to optimized Cu-foils of the prior art literature. Their activity as direct $CO_2$ reduction reaction (DCRR) catalysts is shown in the preliminary data below. The clear structural dependence on activity provides verification of the proposed ability to tune DCRR over HER activity on the inventive class of compounds. Further, seven distinct stable crystalline phases of the above binary catalyst compounds have been prepared as particulate catalysts and evaluated for their $H_2$ evolution activity. This class of materials has shown a varying degree of promise as active $H_2$ evolution catalysts (due to their different structure) and the abundant nature of both binary elements ensures the intrinsic scalable nature of these catalysts. Based on the $H_2$ evolution activity and structure, the DCRR selectivity of these catalysts was found to be tunable.

It has now been discovered that binary Ni—P catalyst compounds (versus single component transition metals) with specific structural motifs can provide optimal binding of $CO_2$ for the reduction to $CH_4$ over the competing HER reaction. These structural motifs optimize the interaction of the surface with the key CO intermediate for DCRR (vide infra). It has been discovered that based on the low required potentials for DCRR on the three model catalysts that this geometry has been altered favorably for this new class of catalysts leading to significant improvements in activity and selectivity within the family of catalysts.

Further, anion exchange membranes allow for the transport of $CO_3^{2-}$ and neutral $CO_2(aq)$ and $H_2O$ to the catalyst surface while restricting $H^+$ accessibility due to charge repulsion. DCRR activity is known to be sensitive to pH in that higher pH improves selectivity but limits $CO_2$ availability. Hence, locally restricting proton availability, rather than increasing the pH of bulk solution is possible using such anion exchange membranes. Therefore one embodiment of the present invention is directed to a composite electrode of the inventive binary catalysts and various polymers with anion conduction properties near the catalyst surface. Such composites show a significantly improved selectivity for DCRR.

Also, ionic liquid (IL) additives should suppress HER activity in favor of DCRR activity by coordination to the catalyst surface thereby improving the DCRR performance of the inventive catalysts. Additionally, adventitious choice of the anion of the ionic liquid is known to have a pronounced effect on the $CO_2$ solubility in the IL, so that ionic liquids having high $CO_2$ solubility can be selected as additives to the inventive binary catalysts.

Metrics for Evaluating Successful DCRR Binary Catalyst Design

For evaluating the binary catalysts of the invention, the following parameters are used based on predictions made by quantum mechanical calculations:

a) Potential requirement: Cu is the state of the art catalyst for the reduction of $CO_2$ to $CH_4$ and requires about −0.74V vs. RHE to initiate the reduction on a smooth surface. This limit has been confirmed by density functional theory (DFT) calculations, and it is understood that this limit would apply to all monometallic catalysts as well. Hence, a successful binary catalyst is defined as a catalyst showing $CH_4$ formation at potentials at or below −0.74V vs. RHE, thereby breaking the scaling relation of monometallic catalysts. Other state of the art catalysts include $SnO_2$ and $In_2O_3$.

b) Faradaic efficiency quantifies how much of the electrical charge are channeled successfully into the products. To date, DCRR generally suffers from low faradaic efficiencies and state of the art on Cu foil is merely ~30% for $CH_4$ at ca. −1V vs. RHE. It has been shown that starting from CO a combined efficiency of 5% towards ethane and ethylene could be achieved at only −0.4V vs. RHE (starting from $CO_2$ these hydrocarbons were not observed). For the purposes of the present invention the overall target of Faradaic efficiency is defined as ≥30% towards $CH_4$. For the initial screening of the pure catalyst materials prior to modification a lower target of ≥5% was set.

Results

As noted above effective $CO_2$ reduction is dependent on CO binding. Effective catalysis is expected to correlate with: 1) addition of surface sites to promote non-perpendicular, "bent" CO binding, and 2) tunable selectivity for delivering H to CO vs. H. Structural analysis shows that for binary compounds two adjacent sites that bind H as hydrides and protons provides the optimal HER activity. Thus, the most effective DCRR-active binary compounds will 1) bind a hydride but not adjacent to an $H^+$ binding site, 2) provide a binding site for CO adjacent to the hydride, and 3) provide an additional element that binds the O atom of CO. It is noted that $CO_2$ reduction on binary transition metal compounds has not yet been extensively researched in literature, with most prior efforts focused on single metals or metal oxides.

Figure 1:
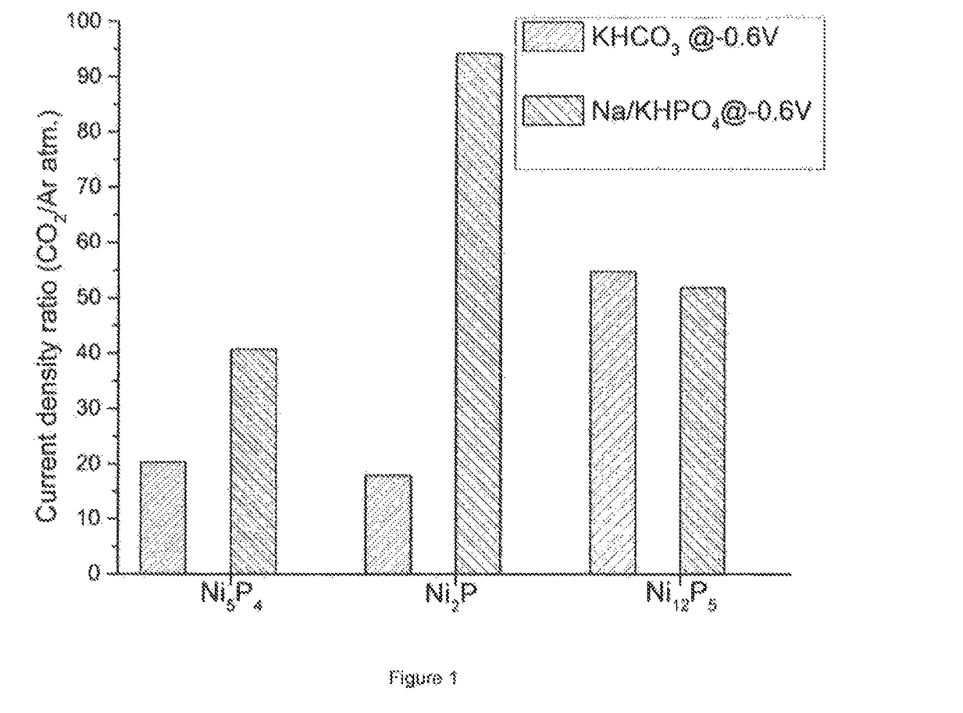
FIG. 1 shows the current density ratio (CO$_2$/Ar atm) for 3 different catalysts (Ni$_5$P$_4$, Ni$_2$P and Ni$_{12}$P$_5$) in bicarbonate and hydrogen phosphate buffers. Electrical current difference between Argon and $CO_2$ purged solutions of carbonate and phosphate are displayed. The potential was corrected for the pH.
Figure 2:
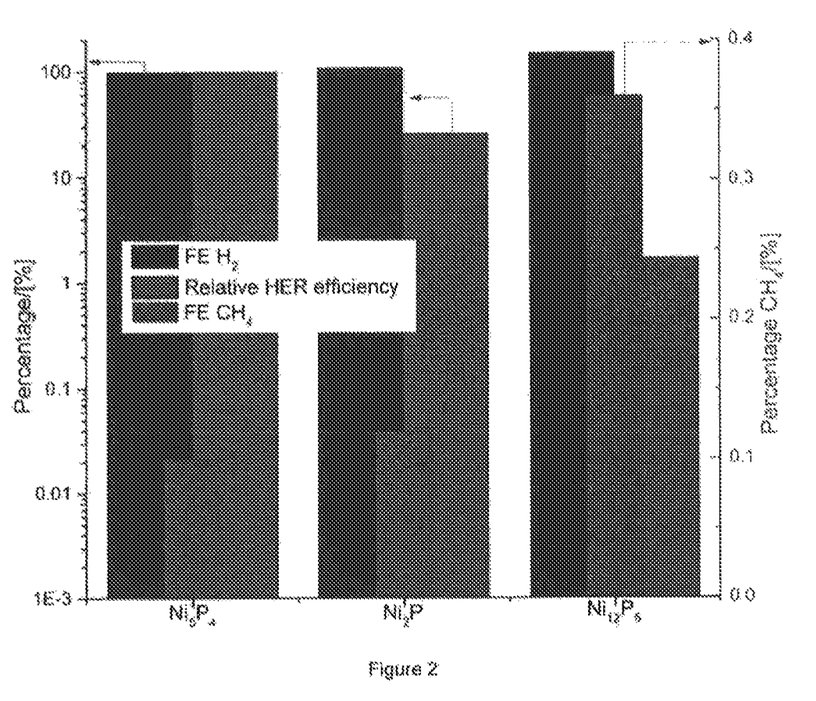
FIG. 2 shows the catalyst comparison in $CO_2$ saturated 0.1M $KHCO_3$. Left axis: (black) Faradaic efficiency $H_2$ and (grey) Relative HER activity (0.5M $H_2SO_4$ 0.1V vs. reversible hydrogen electrode (RHE)). Right axis: (grey) Faradaic efficiency $CH_4$.
Figure 3:
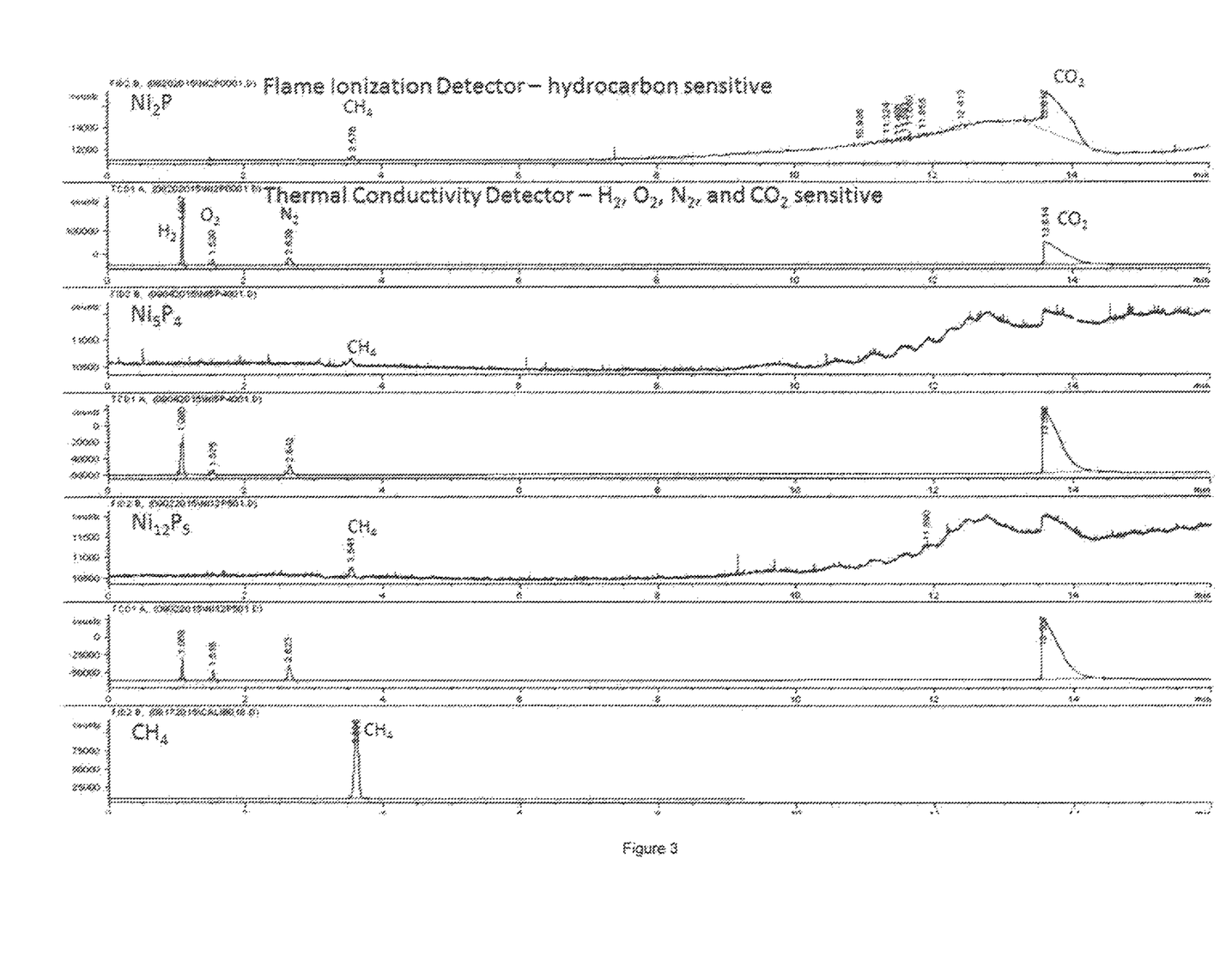
FIG. 3 shows representative gas chromatographic separations of the product gases following electrolysis of a $CO_2$ gas stream over three different solid nickel phosphide electrodes held at −0.7V vs. RHE in $CO_2$ saturated $Na_2CO_3$ solution.

The data with the same binary elements yet different structures ($Ni_5P_4$, $Ni_2P$, $Ni_{12}P_5$) are shown in FIGS. 1, 2 and 3. FIG. 1 illustrates how $Ni_5P_4$ and $Ni_2P$, show a decreased HER current in the presence of $CO_2$ ($CO_3^{2-}$ electrolyte) even at a large driving force (−0.6 vs. RHE). In contrast, $Ni_{12}P_5$ shows little dependence of the HER current with $CO_2$ concentration. This indicates that, for this family of binary compounds where only the crystalline phase changes (the same binary elements), there is a clear difference in how the surfaces bind $CO_2$ and how this inhibits the HER current. Further, FIG. 2 shows that $Ni_{12}P_5$ is more effective at producing $CH_4$ than either $Ni_5P_4$ or $Ni_2P$. Methane production indeed inversely correlates with $H_2$ production on these materials (FIG. 2). Hence, there is a strong structure dependence—and therefore a potential descriptor—for $CH_4$ production on these catalysts.

This would cause the CO molecule to be stabilized in a tilted configuration, thus breaking the scaling relation as noted above. The tilted configuration would open the bound C of CO up for reaction with a hydride from the surface or a $H^+$ from solution. Therefore, in designing new binary Ni—P catalysts a binary compound is sought that 1) binds CO through C and O on either element, respectively, and 2) has sufficiently different HER activity on the two components to limit the HER to the minority component has to have filled d-orbitals to weaken the CO double bond (so called n-donor) and the other an oxophilic/Lewis acid element that interacts with O lone pairs. This ensemble effect would weaken and bend the CO bond and molecule respectively, offering the ideal biding geometry for the DCRR. Another desired property is suppressed $H_2$ evolution currents in the presence of $CO_2$ as this would indicate a strong interaction of the H-binding site and the DCRR sites.

All three catalysts ($Ni_5P_4$, $Ni_2P$, $Ni_{12}P_5$) produced $CH_4$ at $-0.7V$ vs. RHE in $CO_2$ saturated $CO_3^{2-}$ solution which is slightly less than the DFT predicted limit of $-0.74V$ vs. RHE; therefore, it can be deduced that these binary compounds do show a tendency towards breaking the scaling relation. This was the first indicator that the Ni—P compound family may indeed pose a viable way to further reduce the voltage driving force required for $CO_2$ reduction. Based on the results of reduction in $CO_3^{2-}$, this family of DCRR binary catalysts shows a structurally correlated activity for $CO_2$ reduction. Understanding this structure dependence allows for the rational design of new $CO_2$ reduction electrocatalysts.

$Ni_5P_4$, $Ni_2P$, and $Ni_{12}P_5$ also show no release of CO as a gaseous product, likely due to strong bonding of the intermediate on these surfaces. Furthermore, $Ni_5P_4$, $Ni_2P$, and $Ni_{12}P_5$ are the first examples of binary catalyst compounds that break the scaling relation for DCRR.

As an additional strategy to improve activity further, the HER activity of the inventive binary catalysts can be reduced in favor of the DCRR activity by incorporating polymers and/or ionic liquids (ILs) with low $H^+$ conductivity but good $CO_2$ and $H_2O$ transport properties. These polymers and/or ILs can be directly mixed in with the catalyst particles to offer a composite but strictly heterogeneous electrode.

Flow Systems

Thus, three distinct binary transition metal phosphides having pure and stable crystalline phases have been prepared and evaluated their performance as electro-catalysts for $CO_2$ reduction using electrical power as a function of applied potential. These electro-catalysts show that $CO_2$ reduction to methane ($CH_4$) is favored at $-0.6$ V vs. RHE in an unstirred reactor without flowing $CO_2$. This potential is 200 mV less than that needed to drive the same reaction on copper, which is the state of the art electro-catalyst. However, upon switching to a flow reactor in which $CO_2$ is continuously passed over the working electrode, the main carbon-containing product is a solid polymer which analyzes to paraformaldehyde, having the formula $HO[CH_2O]_mH$, where m is typically 3 to about 100. Under these conditions the catalysts do not induce formation of carbon monoxide, a poisonous gas that requires special handling if produced. This selectivity offers another advantage over a copper catalyst, which produces CO in large quantities.

Figure 4:
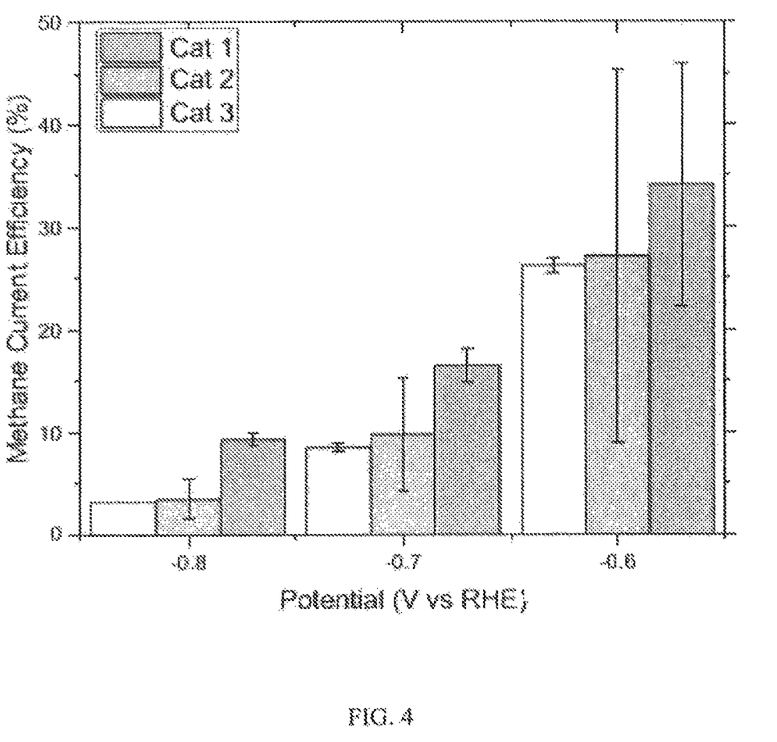
FIG. 4 shows current efficiencies for methane production by three nickel phosphide catalysts according to the present invention, measured at −0.6 V, −0.7 V and −0.8 V vs. RHE. Cat 1 (right hand bar in each group) is $Ni_{12}P_5$, Cat 2 (middle bar in each group) is $Ni_2P$, and Cat 3 (left hand bar in each group) is $Ni_5P_4$. Methane is the main carbon reduction product in an unstirred reactor with no flowing $CO_2$. The average of at least three measurements is depicted with error bars corresponding to one standard deviation.
Figure 5:
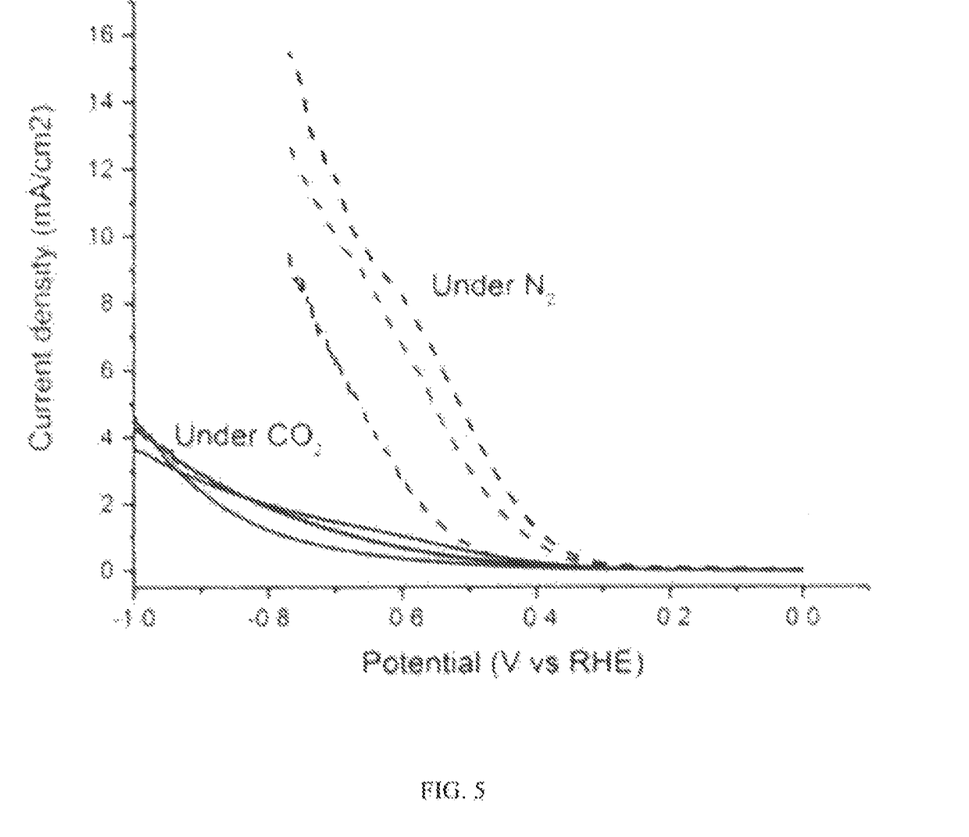
FIG. 5 shows the linear sweep voltammetry of three nickel phosphide electrodes according to the present invention ($Ni_{12}P_5$, $Ni_2P$ and $Ni_5P_4$), in 0.1 M $KHCO_3$ (pH 6.8) at 100 mV/s under $N_2$ and under $CO_2$.

FIG. 4 shows the Faradaic yields of DCRR products at room temperature in constant potential electrolysis for three catalysts of the invention, $Ni_{12}P_5$, $Ni_2P$ and $Ni_5P_4$. The electrode potential ranged from $-0.6$ to $-0.8$ V vs. RHE. Methane is the main carbon reduction product in an unstirred reactor with no flowing $CO_2$. The Faradaic yields were calculated on the basis of the number of electrons required for the formation of one molecule of the products from $CO_2$ and $H_2O$.

The only gaseous DCRR product formed on these electrodes was $CH_4$ (besides $H_2$). Using the TCD and FID detectors, ppm amounts of $H_2$, $N_2$, $O_2$, $CH_4$, $C_2H_6$, $CO_2$, $C_2H_4$ and CO could be quantified. The linear sweep voltammetry scans show inhibition of $H_2$ formation under constant $CO_2$ bubbling.

Figure 6:
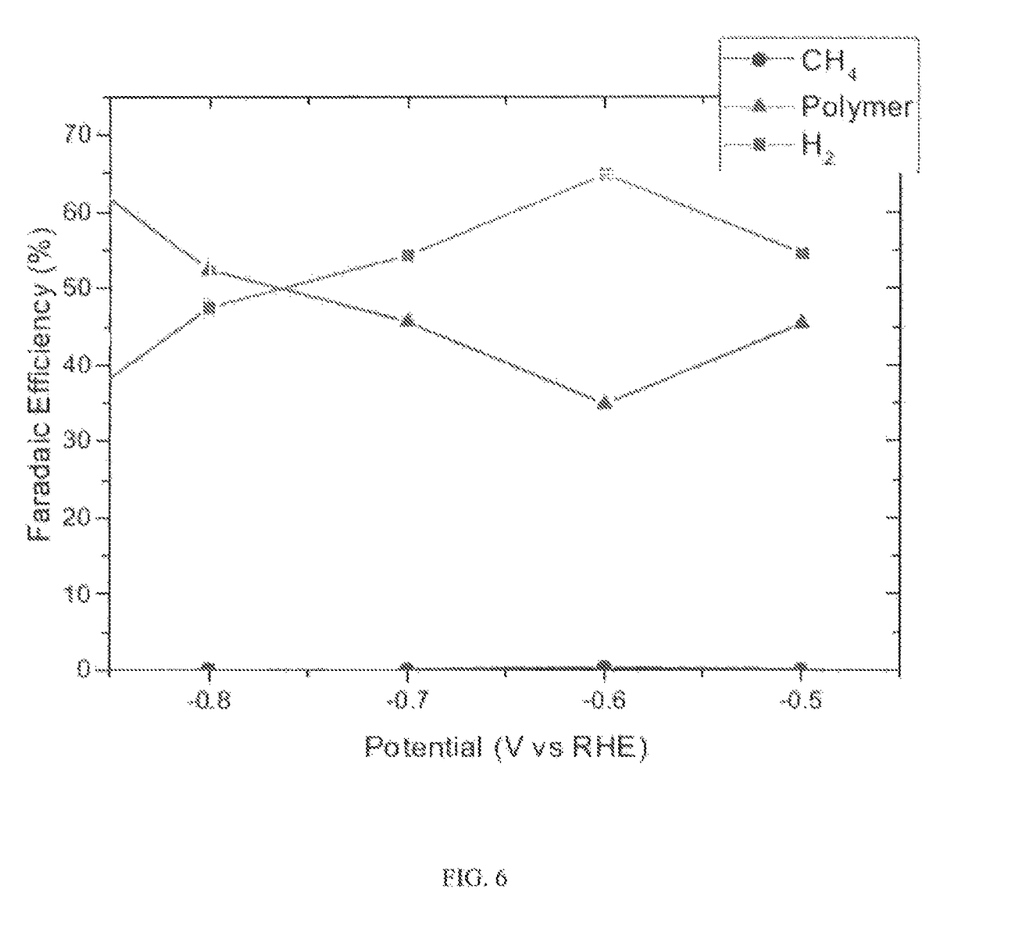
FIG. 6 shows that when scaled up to a flow electrolyzer with 4 $cm^2$ electrodes, a nickel phosphide catalyst according to the present invention ($Ni_5P_4$) produces formaldehyde which is isolated as a polymer from water with the formula $HO[CH_2O]_mH$. The production of hydrocarbons is significantly lower for at least this nickel phosphide catalyst.

In order to increase the availability of carbon dioxide in aqueous media, a flow electrolyzer was designed and built, that allows $CO_2$ to be continuously flowed over the working electrode surface. Upon application of a high current density and constant supply of $CO_2$, a polymer was formed using $Ni_5P_4$ as a representative catalyst. Characterization of the product by NMR indicated that the polymer product was paraformaldehyde, having the formula $HO[CH_2O]_mH$, where m is typically 3 to about 100. The relative yield of products versus potential is plotted in FIG. 6.

Thus, phase pure transition metal phosphides are capable of reducing carbon dioxide to hydrocarbons at lower overpotentials than the state of the art catalysts currently available (Cu, $SnO_2$ and $In_2O_3$). If good carbon dioxide saturation is provided and a relatively high current density (10 mA/cm$^2$) is applied, polymeric products can be formed in aqueous media.

One aspect of the present invention is directed to a cathode comprising a conductive support substrate and a catalyst coating, the catalyst coating comprising nanoparticles of $Ni_xP_y$ (also referred to herein as "Ni—P"), where x and y represent integers such that the compounds are selected from the group consisting of $Ni_3P$, $Ni_5P_2$, $Ni_{12}P_5$, $Ni_2P$, $Ni_5P_4$, $NiP_2$, and $NiP_3$. In one embodiment the catalyst nanoparticles have grain sizes in the range from about 5 to about 5000 nm. In one embodiment, the particles range in size from about 10 to about 4000 nm. In another embodiment the particles range in size from about 25 to about 3000 nm. In yet another embodiment, the particles range in size from about 50 to about 2500 nm. According to another embodiment, the particle size is at least 100 nm.

In one embodiment the conductive support substrate further incorporates a material to be reduced, where the catalyst coating catalytically interacts with the material to be reduced incorporated into the conductive support substrate. In one embodiment the cathode material to be reduced comprises carbon dioxide, carbon monoxide, or a mixture thereof.

Another aspect of the invention is directed to a cathode comprising a conductive support substrate and a catalyst coating, the catalyst coating comprising nanoparticles of an alloy of one or more of the above $Ni_xP_y$ compounds and $Fe_2P$, where the alloy has a Ni—P:$Fe_2P$ ratio of between 100:0 to 0:100 wt %. In one embodiment, the Ni—P:$Fe_2P$ ratio is between about 99:1 to about 1:99 wt %. In another embodiment, the Ni—P:$Fe_2P$ ratio is between about 95:5 to about 5:95 wt %. In yet another embodiment, the Ni—P:$Fe_2P$ ratio is between about 90:10 to about 10:90 wt %. According to another embodiment, the Ni—P:$Fe_2P$ ratio is between about 25:75 to about 75:25 wt %.

In one embodiment, the Ni—P compound is $Ni_2P$. In one embodiment the catalyst alloy nanoparticles have grain sizes in the range from about 5 to about 5000 nm. In one embodiment, the alloy particles range in size from about 10 to about 4000 nm. In another embodiment the alloy particles range in size from about 25 to about 3000 nm. In yet another embodiment, the alloy particles range in size from about 50 to about 2500 nm. According to another embodiment, the alloy particle size is at least 100 nm. In one embodiment the conductive support substrate further incorporates a material to be reduced, where the catalyst coating catalytically interacts with the material to be reduced incorporated into the conductive support substrate. In one embodiment the cathode material to be reduced comprises carbon dioxide, carbon monoxide, or a mixture thereof.

In some embodiments the conductive support substrate of the above cathodes comprises hydrophobic regions and hydrophilic regions to aid in adsorption of carbon dioxide and/or carbon monoxide from gas or aqueous phase to achieve separation from water molecules, where at least some of the catalyst nanoparticles are in the hydrophobic regions of the conductive support substrate and catalytically interact with the carbon dioxide and/or carbon monoxide by electrical reduction to produce hydrocarbon products, $[CH_n]_m$ or carbohydrate products, $[CH_nO]_m$, where n and m are integers. The hydrocarbon product can be a mixture of hydrocarbons, or a single hydrocarbon (such as methane, ethane, butane, etc.) Likewise, the carbohydrate product can be a mixture of hydroxylated hydrocarbons, aldehydes, ketones, carboxylates, or a single member of these families (such as methanol, ethanol, butanol, etc.). Further, the carbohydrate product can be a mixture of the above products. In one embodiment the carbohydrate product comprises paraformaldehyde. In one embodiment the conductive support substrate is an ionomer or conducting polymer.

A further aspect of the invention is directed to a method for generating hydrocarbon or carbohydrate products from water, and carbon dioxide and/or carbon monoxide via an electrolysis reaction, comprising the steps of: (a) placing a catalyst-coated cathode of the present invention in an electrolyte comprising water, together with an anode; (b) placing the anode and cathode in conductive contact with an external source of electricity; (c) providing a source of carbon dioxide and/or carbon monoxide to the cathode; and (d) using the external source of electricity to drive an electrolysis reaction at the cathode, where hydrocarbon products, $[CH_n]_m$, or carbohydrate products, $[CH_nO]_m$, are generated from the carbon dioxide and/or carbon monoxide, and where n and m are integers.

Another aspect of the invention is directed to a method for reduction of carbon dioxide to hydrocarbons or carbohydrate products comprising: (a) placing a catalyst-coated cathode of the present invention in an electrolyte, which may or may not contain water, together with an anode; (b) placing the anode and cathode in conductive contact with an external source of electricity; (c) providing a source of carbon dioxide to the cathode; and (d) using the external source of electricity to drive an electrolysis reaction at the cathode, where hydrocarbon products, $[CH_n]_m$, or carbohydrate products, $[CH_nO]_m$, are generated from the carbon dioxide, and where n and m are integers.

Yet another aspect of the invention is directed to a method for generating carbohydrate products from water, and carbon dioxide and/or carbon monoxide via an electrolysis reaction, comprising: (a) placing a cathode as described above in an electrolyte together with an anode; (b) placing the anode and cathode in conductive contact with an external source of electricity; (c) providing a flowing source of carbon dioxide and/or carbon monoxide to the cathode; and (d) using the external source of electricity to drive an electrolysis reaction at the cathode, whereby carbohydrate products, $[CH_nO]_m$, are generated from the carbon dioxide and/or carbon monoxide, and where n and m are integers. In one embodiment of the method the flowing source of carbon dioxide and/or carbon monoxide is provided via a flow reactor. In another embodiment of the method the carbohydrate product comprises paraformaldehyde.

A further aspect of the invention is directed to a method for reduction of carbon dioxide to carbohydrate products comprising (a) placing a cathode as described above in an electrolyte together with an anode; (b) placing the anode and cathode in conductive contact with an external source of electricity; (c) providing a flowing source of carbon dioxide to the cathode; and (d) using the external source of electricity to drive an electrolysis reaction at the cathode, whereby carbohydrate products, $[CH_nO]_m$, are generated from the carbon dioxide, and where n and m are integers. In one embodiment of the method the flowing source of carbon dioxide is provided via a flow reactor. In another embodiment of the method the carbohydrate product comprises paraformaldehyde.

The catalysts in the examples below were synthesized and characterized by physical characterization methods to ascertain their atomic structure and their HER activity is tested electrochemically and by gas chromatography. The inventive catalysts can be used in conjunction with a titanium film electrode, for example, by being pressed into a pellet and bonded to a titanium film electrode via silver paint and sealed in a non-conducting epoxy. Alternatively, the catalysts can be supported on carbon or ceramic powder.

The as-synthesized catalysts of this disclosure have grain sizes in the range from about 5 nm to about 5000 nm, preferably from about 5 nm to about 1000 nm, more preferably from about 5 nm to about 500 nm, and even more preferably from about 5 nm to about 20 nm. These grains are part of larger 0.3-1.8 µm spherical particle agglomerates. The durability of the catalyst under electrolysis conditions in both 1M $H_2SO_4$ acid and 1M NaOH, was found to be very good.

Evidence comes from both electrochemical stability and X-ray fluorescence confirming atomic composition of the surface, and from physical appearance at the macroscale.

Support Substrates

According to another aspect of the invention the catalyst comprises a catalytic group and a conductive support substrate supporting a plurality of the catalytic groups. In certain embodiments, the support substrate is capable of incorporating hydrogen cations, and at least some of the catalytic groups supported by the support substrate are able to catalytically interact with the hydrogen cations incorporated into the support substrate. In certain other embodiments, the support substrate is capable of incorporating water molecules, and at least some of the catalytic groups supported by the support substrate are able to catalytically interact with water molecules incorporated into the support substrate. In other embodiments, the support substrate is capable of incorporating carbon dioxide, and at least some of the catalytic groups supported by the support substrate are able to catalytically interact with $CO_2$ molecules incorporated into the support substrate.

The support substrate has a plurality of porous regions that are microporous, mesoporous, and/or macroporous. In certain embodiments, the support substrate is a microporous substrate having an average pore size of less than about 2 nm. In certain other embodiments, the support substrate is a mesoporous substrate having an average pore size of from about 2 to about 50. In yet other embodiments, the support substrate is a macro-porous substrate having an average particle size of greater than about 50 nm.

The support substrate is conductive to electrons so that when an electric potential difference is present across separate points on the support substrate, the mobile charges within the support substrate are forced to move, and an electric current is generated between those points. In one embodiment, the support substrate is rendered conductive by applying a thin layer of the support substrate onto a conductive material. Suitable conductive materials include glassy carbon, carbon nanotubes and nanospheres, fluoride doped tin oxide (FTO or ((F)$SnO_2$)) coated glass and indium tin oxide (ITO) (or any of the transparent conductive oxides) coated glass, and multilayer structures having nano-structured semiconductor films coated onto the conductive substrates. Other means of causing the support substrate to be conductive are within the scope of the invention. For example, in one embodiment, the support substrate contacts a sensitized semiconductor.

Preferably, the support substrate has hydrophobic regions and hydrophilic regions. In embodiments for the reduction of water or $CO_2$, while not wishing to be limited by theory, it is thought that at least some of the catalytic groups can be supported in the hydrophobic regions of the support substrate and once supported are able to catalytically interact with water or $CO_2$ molecules in the hydrophilic regions. Effectively, the support substrate is thought to act as an interface between hydrogen cations, water molecules or $CO_2$ molecules and the catalytic groups which are otherwise insoluble in aqueous solution.

In one embodiment, the hydrophobic regions are formed by a hydrophobic polymeric backbone and the hydrophilic regions are regions of ionizable functional groups, preferably on the polymer backbone that can serve as sites for proton conductance. Preferably the ionizable functional groups are sulfonate groups (—$SO_3H$) that lose a proton to form negatively charged sulfonate groups. Alternatively, the ionizable functional groups can form positively charged functional groups that can serve as sites for hydroxide or carbonate ion conductance, if preferred.

The support substrate can be, for example, polysulfones, polysulfonates, and poly-phosphonates. In certain preferred embodiments, the supports substrate comprises a sulfonated fluoro-polymer (sold under the trade mark of NAFION®). The hydrophobic $CF_2CF(CF_3)O$— polymer backbone of NAFION® forms a hydrophobic solid that is penetrated by aqueous channels lined with the hydrophilic ionizable sulfonic acid groups. Investigations into the sub-structure of NAFION® coatings on solid surfaces have revealed that the polymer layers contain these hydrophilic channels throughout the otherwise hydrophobic regions of the membrane. These channels allow the diffusion of small molecules such as water.

Other support substrates that can be used include, for example, perfluorinated sulfonic acid polymer cation-exchange membranes such as F-14100, F-930 and F-950, the GEFC perfluorinated proton exchange membranes, polysulfone ionomers, nanostructured films formed by metal oxide nanoparticles suitably decorated with organic acids including perfluorinated sulfonic acids, nanostructured films formed by the hydrolysis of alkoxysilanes suitably decorated with organic acids including perfluorinated sulfonic acids.

Other supporting substrates can be, for example, polyfluorinated alkaline exchange membranes (AEM) that rely upon fixed cationic functional groups within the polymer to prevent the conduction of protons and allow conduction of mobile anions for conductivity. Examples of commercial AEMs include TOKUYAMA® AEM. Also within the scope are heterogeneous-homogeneous colloidal systems, two-phase mixtures (stabilized and unstabilized with surfactant), conducting polymers (e.g., poly(3,4-ethylenedioxythiophene) (PEDOT)), surface-modified silica and titania.

Any means of contacting the catalyst with water. $CO_2$ or carbonate mineral is within the scope of the invention. In one embodiment, the catalyst is immersed in a solution containing water molecules. The solution can be an aqueous solution containing electrolyte. In another embodiment, the aqueous solution can be a solution from which water is preferentially removed (i.e. solid liquid separation). For example when the aqueous solution is salt water or sea water the water could be removed leaving the salt behind (i.e., desalination). In one embodiment about 0.1M electrolyte is sufficient.

The following examples are provided to further illustrate the methods and compositions of the present invention. These examples are illustrative only and are not intended to limit the scope of the invention in any way.

EXAMPLES

Example 1

Electrode Fabrication 100 mg of catalyst powder was suspended in 250 μL of 5% NAFION® suspension previously neutralized with NaOH. The catalyst powder was continuously mixed with the NAFION® suspension by mortar and pestle until dried. To fully dry these they were further dried under vacuum for several hours.

50 mg of the resulting catalyst/polymer composite was pressed under 5 tons of pressure in a 6 mm diameter die. The resulting pellet was cut in half and each half mounted on a Ti plate (Sigma-Aldrich) with a drop of Ag-paint (SPI supplies). The Ti plate was previously fixed to a copper wire with Ag-paint. The copper wire assembly was threaded through a glass tube. After drying, the Ag-paint, the sides of the catalyst pellet, and Ti plate was isolated from solution by covering in Hysol™ T1 epoxy (Logitech) all the way up onto the glass tube. The geometric surface area was determined by imaging the exposed surface and measuring it using the ImageJ™ software.

Example 2

Electrochemical Measurement

All solutions were prepared using MILLIPORE® water. Electrochemical cells were cleaned using piranha solution (1:3 35% $H_2O_2$ and concentrated $H_2SO_4$) followed by thorough rinsing in MILLIPORE® water. A three electrode setup with a NAFION® membrane or anion-exchange membrane separator of working and counter compartment was used for all the electrochemical measurements. To avoid the possibility of Pt contamination a B-doped diamond electrode was used as a counter electrode during stability measurements. A homemade Hg/$HgSO_4$ (Sat'd KCl) reference electrode was used and calibrated against a commercial Saturated Calomel electrode (Hack) at open circuit potential prior to each measurement. Chronoamperiometric data was not uncompensated IR-drop, as only small currents on the order of hundreds of microamperes were drawn, effectively removing this source of error.

Electrolytes were prepared from MILLIPORE® water using high purity grade reagents. Furthermore, as a further precaution to remove potential metal impurities solutions were filtered through $K^+$-CHELEX® 100 matrix. Electrolytes were stored in Piranha-cleaned flasks until used. Just prior to measurements the electrolytes were saturated with $CO_2$ (Airgas CD1200) cleaned using a Supelco hydrocarbon trap (Sigma) to <6 ppm $CH_4$ (the major hydrocarbon impurity).

Product analyses were conducted on a HP5890 Series II GC with a 5A MSieve (Restek) 0.53 mm capillary column using Ar carrier gas (cleaned for hydrocarbons and moisture on a Supelco Hydrocarbon, moisture trap). Calibrations were performed using certified mixed gasses i.e. 1.04% $CH_4$/Ar from Airgas, 1.02% $H_2$/Ar, and pure $C_2H_4$ likewise from Airgas.

Catalyst Fabrication: Solid State Synthesis 1.5 mol % stoichiometric excess of red phosphorous (Alfa-Aesar 99%) and stoichiometric amounts of nickel (Sigma-Aldrich <150 μm) were thoroughly mixed in a mortar. Transferred to a quartz tube evacuated and sealed after cleaning with Ar by back filling 2-3 times. The evacuated tubes were placed in a furnace and ramped to 700° C. and kept there for 24 hours. Ramp rates were modest to avoid excessive heating upon reaction. Temperatures were ramped from 80° C. to 250° C. over 580 min with a 360 min dwell time, then to 350° C. over 300 min with a 200 min dwell time, then to 450° C. over 300 min with a 200 min dwell time, and finally to 700° C. over 350 min with a 24 hour dwell time. Samples were then cooled to room temperature under ambient conditions. Sample purity was checked by powder X-ray diffraction (PXRD) and additional Ni or P was added if necessary, mixed and sealed as above, and reheated using an accelerated sequence (580 min from 80° C. to 750° C. with a 24 hour dwell time).

This method produced micron sized particles which were then melted at 1200° C. in evacuated quartz tubes and recrystallized by slow cooling to 900° C. Any phosphorous that was lost during this procedure could be diffused into the resulting rods by heating to 700-900° C. for 24 hours, yielding phase pure slugs of $Ni_xP_y$ that could be machined into flat electrodes with a well-characterized surface area.

Nanoparticulate nickel phosphides were prepared starting from 20 nm Ni nanoparticles (99.9% USNano Ltd.) which were lightly mixed with 101.5 mol % red P in a glovebox under Ar. The sample was sealed in an evacuated quartz tube and heated slowly to 450° C. with a dwell time of 48 hours. The ramp was 80° C. to 175° C. in 580 min, followed by dwell for 360 min, ramp to 250° C. in 580 min, followed by dwell time of 360 min, then ramped to 350° C. in 360 min, followed by dwell time 300 min, and then finally to 450° C. in 360 min, followed by 48 hours dwell time. The sample cooled to room temperature under ambient conditions, and phase purity was checked by PXRD. Additional P could then be added in air analogous to the solid state reaction in 1). Ramp rates for additional P addition were 580 min from 80° C. to 450° C. and dwell time of 48 hours. Occasionally, small impurities of $Ni(PO_3)_2$ were formed during air exposure and this phase was removed by acid washing in diluted HCl (~1:10 conc. HCl to water by volume).

Crystal phase characterization was done on a Bruker AXS D8 Advance x-ray diffractometer with Cu $K\alpha 1$ radiation (1.54056 Å), a scan time of 1 hr or 12 hr, and a 2θ range of 15-70° or 10-120°. Samples were analyzed prior to electrochemical testing by dispersing the powder between two glass microscope slides.

Example 3

$Ni_3P$ Catalyst Synthesis

The catalysts were synthesized using the solid state method. In a typical experiment 5 g Ni metal (Sigma-Aldrich 99.99%, <150 μm) was mixed thoroughly with 2.141 g red phosphorous (Alfa-Aesar, 98.9%, 325 mesh) using a mortar and pestle for 20 min. The mixture was loaded into a quartz tube and evacuated to a base pressure of ca. $2 \cdot 10^{-3}$ mtorr. The tube was backfilled with high purity argon and evacuated 3 times prior to sealing. The tube was then heated in a box furnace to 700° C. for 24 hr. A slow ramp cycle was used during heating to avoid local hotspots in the mixture during reaction. The ramp was 580 min to 350° C. then hold for 300 min., then ramped to 450° C. for 200 min followed by 300 min hold, then ramped to 550° C. for 200 min and hold for 300 min, followed by a 300 min ramp to 700° C. hold for 24 hr and cool to RT in 90 min. After recovery the sample was crushed and checked by PXRD. If minor impurities were seen, additional Ni or P was added and the sample sealed in a quartz tube as above. The sample was then heated to 700° C. for 24 hr again.

Example 4

Characterization of $Ni_3P$ Nanoparticles

PXRD analysis was performed on a Bruker AXS D8 Advance using a Cu $K\alpha$ X-ray tube (1.546 Å), a scan time of 1 hour or 12 hours, and a 2θ range of 15-70° or 10-120°. Samples were analyzed prior to electrochemical testing by dispersing the powder on a glass microscope slide and flattening the powder surface using another glass slide. Electrodes analyzed after electrochemical tests were measured by gently cutting the Ti-foil free from the Pyrex tube and removing the Cu-wire. The pellet and Ti-foil was placed on a glass slide and the PXRD pattern recorded.

High-resolution transmission electron microscopy (HR-TEM) analysis was performed at 200 keV, vacuum pressure of about $2 \times 10^{-7}$ Torr, and operated using the standard imaging and diffraction mode. Powder samples from the electrodes were placed on an Au mesh TEM grid (300 mesh, 3 mm in diameter) that was previously covered by a thin carbon layer (support film). These samples were also analyzed using scanning electron microscopy (SEM) operated at 15 kV and 5 kV accelerating voltage, 140 pA probe current, 2000 cps as average count rate on the whole spectrum, and a counting time of 60 second.

Electrodes were run for 6 hours prior to analysis in either 1M NaOH or 1M $H_2SO_4$ under continuous $H_2$ bubbling. Then quickly removed from the cell and rinsed in copious amounts of Nanopure water followed by light rinsing in ethanol and dried at room temperature. The solution exposed nanoparticles were removed by scratching the surface of the electrode lightly in a drop of high purity acetone. The acetone was then removed and dropped onto a lacey carbon film on an Au-grid. After drying the samples was examined in the microscope.

Catalyst Fabrication: Hydrothermal or Solvothermal Methods

Nanoparticles were also successfully prepared by hydrothermal or solvothermal methods as described in literature: Henkes, A. E., & Schaak, R. E. (2007). Trioctylphosphine: A general phosphorus source for the low-temperature conversion of metals into metal phosphides. *Chemistry of Materials*, 19(17), 4234-4242. doi:10.1021/cm071021w Laursen, A. B., Patraju, K. R., Whitaker, M. J., Retuerto, M., Sarkar, T., Yao, N., . . . Dismukes, G. C. (2015). Nanocrystalline Ni5P4: a hydrogen evolution electrocatalyst of exceptional efficiency in both alkaline and acidic media. *Energy Environ. Sci.*, 8(3), 1027-1034. doi:10.1039/C4EE02940B Muthuswamy, E., Savithra, G. H. L., & Brock, S. L. (2011). Synthetic Levers Enabling Independent Control of Phase, Size, and Morphology in Nickel Phosphide Nanoparticles. *ACS Nano*, 5(3), 2402-2411. doi:10.1021/nn1033357

Prins, R., & Bussell, M. E. (2012). Metal Phosphides: Preparation, Characterization and Catalytic Reactivity. *Catalysis Letters*, 142(12), 1413-1436. doi:10.1007/s10562-012-0929-7

Example 5

Synthesis of $Ni_5P_4$ Nanoparticles Using Solvothermal Method

Using the solvothermal synthesis route disclosed previously (see PCT/US2013/078486), $Ni_5P_4$ was synthesized as phase pure nanoparticles ($Ni_5P_4$ NPs). About 0.385 g Ni(acetylacetonate, $acac)_2.xH_2O$ (Sigma-Aldrich) was placed in a 3-necked flask together with about 2.5 g tri-n-octylphosphine oxide, TOPO (Strem Chemicals). The flask was connected to a condenser in one port, a Schlenk line in the other, and corked in the third. The condenser was connected to a silicone oil bubbler venting into a fumehood.

The flask was degassed under vacuum and then refilled with high purity argon (Air-liquid). A flow of Ar was established through the flask before adding 10 ml of tri-n-octylphosphine, (TOP; Strem Chemicals) under an argon (Ar) blanket. The solution was left under Ar flow for approximately 20 minutes to remove any oxygen. The Ar flow was adjusted to a slow rate 1 bubble per second and the flask was then placed on a pre-heated sand bath at 390° C. for 1.5 hours. The TOPO quickly melted completely and the solution started refluxing and producing white smoke, thereafter turning brown then black. The flask was buried so that the thermoprobe of the temperature controller of the sand bath was level with the top of the reactant liquid and the sand surface was approximately 1 cm above the liquid level.

After reaction for 1.5 hours the flask was removed from the heat and cooled to room temperature. The black solution was transferred to a centrifuge tube with hexanes and diluted 4:10:1 by volume with 96% ethanol (EtOH) and acetic acid (98% Sigma-Aldrich). After centrifugation a gray powder was recovered. The powder was suspended in hexanes by sonication and washed with addition of ethanol and acetic acid, which was repeated twice. The powder was then washed three times in acetone by centrifugation and decantation followed by one cleaning in ethanol. The recovered powder was dried under vacuum.

Example 6

Synthesis

Sintered disks of single-phase, crystalline metal phosphides were synthesized using a traditional solid state synthesis. Briefly, metal powder and red phosphorous in stoichiometric amounts plus 1 wt % excess phosphorous were ground with an agate mortar and pestle. The mixtures were sealed in evacuated quartz tubes and heated according to the following ramp:

The resulting product was analyzed using PXRD and, if any of the crystalline phases impurity was present, the composition was adjusted to the right stoichiometry and the heating procedure repeated until the desired phase was pure. The resulting material was mounted as an electrode with a contact encapsulated in chemical-resistant epoxy.

Example 7

Electrochemistry

The electrochemical measurements were performed in a 4-neck flask with rubber seals. The catholyte (5 mL) was separated by a SELEMION® anion exchange membrane from the anolyte compartment (1 mL). Electrodes were prepared with the transition metal phosphides using a back contact of silver epoxy and copper wire, enclosed in glass and sealed with epoxy (Hysol™ 1C). The potential of the cathode was measured with respect to a homemade $Hg/Hg_2SO_4/K_2SO_4$ saturated reference electrode, calibrated daily against an ACCUMET® standard calomel electrode. Platinum mesh was used as the counter electrode. The electrolyte solution, $0.1M\ KHCO_3$, was prepared with MILLIPORE® water and reagent grade chemicals, was purified by treatment with CHELEX® 100 (potassium form) resin to remove trace divalent cations known to interfere with $CO_2$ reduction.

Cyclic voltammetry experiments were conducted using a CH Instruments potentiostat. The electrodes were pre-conditioned for 10 min at −0.5 V. For measurements conducted under a $N_2$ flow, the pH of the electrolyte was adjusted to 6.8 with 0.5 M $H_2SO_4$.

The current efficiency measurements were conducted after purging the electrochemical cell and electrolyte for 60 min with 4.0 grade $CO_2$ further purified with a hydrocarbon trap (Supelpure HC). The flow of $CO_2$ during electrolysis was 10 sccm, measured with a gas flow meter. A constant potential was applied for 2 hours under magnetic stirring. The GC auto-sampler injected a 500 μL sample from the headspace every 25 minutes. The current efficiency (CE) was then calculated using the equation:

$$CE = \frac{nFe}{Q}$$

where n is the number of moles of a given product, F is Faraday's constant, e is the number of electrons necessary to generate one molecule of product (2 for $H_2$, 8 for $CH_4$, 12 for $C_2H_4$) and Q is the charge (current*time).

Example 8

Gas Chromatography

An HP 5890 Series II gas chromatograph equipped with a TCD and a FID detectors arranged in series and a 30 m megabore molecular sieve 5A column (Restek) was employed for quantifying gaseous products. The GC was calibrated with gas standards and the number of moles of the products in the headspace of the cell determined by the ideal gas law.

INDUSTRIAL APPLICATION

Electrocatalysts for the direct $CO_2$ reduction to hydrocarbons may be realized through flow electrolyzers of similar types to the chlor-alkali producing cells currently used on an industrial scale. $CO_2$ sources could be point sources such as power stations, cement plants, or similar large $CO_2$ emitting industries or from extraction directly from the atmosphere. The $Ni_xP_y$ phase would be applied as nanoparticles or microparticles (5-5000 nm) on a conductive substrate electrode. The particles may be affixed using one or more polymers with or without chemical binding groups for coordination of protons or $CO_2$. This polymer may be of the same type as the supporting membrane conducting ions from the anode to cathode. Electrolysis may be performed around neutral pH using carbonate, phosphate, KCl, or sulfate electrolytes.

The inventive $Ni_xP_y$ catalysts have the potential to be a direct alternative to fossil raw materials (crude oil, coal, and natural gas) as a source for chemical feedstocks and energy storage. Carbon neutral synthetic fuels resulting from this technology will not need the expensive and environmentally impactful fossil fuel supply chain (mining/drilling, pipelines/tankers, refineries). Fuel could be made on demand and at strategic locations near hubs. Carbon chemical feedstocks could be tailor-made and would not be the result of the inefficient processing of raw fossil materials.

Without further elaboration, it is believed that one skilled in the art, using the preceding description, can utilize the present invention to its fullest extent. Furthermore, while the present invention has been described with respect to aforementioned specific embodiments and examples, it should be appreciated that other embodiments utilizing the concept of the present invention are possible, and within the skill of one in the art, without departing from the scope of the invention. The preceding preferred specific embodiments are, therefore, to be construed as merely illustrative, and not limitative of the disclosure in any way whatsoever.

What is claimed is:

1. A cathode for direct electrochemical reduction of carbon dioxide and carbon monoxide to hydrocarbons and carbohydrates, said cathode comprising a conductive support substrate and a catalyst coating, said catalyst coating comprising nanoparticles of $Ni_xP_y$, wherein x and y represent integers such that the compounds are selected from the group consisting of $Ni_3P$, $Ni_5P_2$, $Ni_{12}P_5$, $Ni_2P$, $Ni_5P_4$, $NiP_2$, and $NiP_3$,
wherein the conductive support substrate comprises hydrophobic regions and hydrophilic regions to aid in adsorption of carbon dioxide and/or carbon monoxide from gas or aqueous phase to achieve separation from water molecules, wherein at least some of the catalyst nanoparticles are in the hydrophobic regions of the conductive support substrate and catalytically interact with said carbon dioxide and/or carbon monoxide by electrical reduction to produce hydrocarbon products or carbohydrate products.

2. The cathode of claim 1, wherein said catalyst coating comprises nanoparticles of $Ni_2P$ further alloyed with $Fe_2P$, wherein the alloy has a $Ni_2P:Fe_2P$ ratio of about 99:1 to about 1:99 wt %.

3. The cathode of claim 2, wherein the catalyst nanoparticles have grain sizes in the range from about 5 to about 5000 nm.

4. The cathode of claim 2, wherein the conductive support substrate further incorporates a material to be reduced, whereby the catalyst coating catalytically interacts with the material to be reduced incorporated into the conductive support substrate.

5. The cathode of claim 4, wherein the material to be reduced comprises carbon dioxide, carbon monoxide, or a mixture thereof.

6. The cathode of claim 1, wherein the catalyst nanoparticles have grain sizes in the range from about 5 to about 5000 nm.

7. The cathode of claim 1, wherein the conductive support substrate further incorporates a material to be reduced, whereby the catalyst coating catalytically interacts with the material to be reduced incorporated into the conductive support substrate.

8. The cathode of claim 7, wherein the material to be reduced comprises carbon dioxide, carbon monoxide, or a mixture thereof.

9. The cathode of claim 1 wherein said conductive support substrate is an ionomer or a conducting polymer.

10. A method for generating hydrocarbon or carbohydrate products from water, and carbon dioxide and/or carbon monoxide via an electrolysis reaction, comprising:
    (a) placing a cathode of claim 1 in an electrolyte together with an anode;
    (b) placing said anode and cathode in conductive contact with an external source of electricity;
    (c) providing a carbon source of carbon dioxide and/or carbon monoxide to said cathode; and
    (d) using said external source of electricity to drive an electrolysis reaction at said cathode, whereby hydrocarbon products or carbohydrate products are generated from said carbon dioxide and/or carbon monoxide.

11. The method of claim 10, wherein the carbon source is carbon dioxide.

12. The cathode of claim 1, wherein said carbohydrate product comprises paraformaldehyde.

13. The method of claim 10, wherein carbohydrate products are generated from water, and carbon dioxide and/or carbon monoxide via an electrolysis reaction,
    wherein said source of carbon dioxide and/or carbon monoxide is a flowing source,
    whereby carbohydrate products are generated from said carbon dioxide and/or carbon monoxide.

14. The method of claim 13, wherein said flowing source of carbon dioxide and/or carbon monoxide is provided via a flow reactor.

15. The method of claim 13, wherein said carbohydrate product further comprises paraformaldehyde.

16. A method for reduction of carbon dioxide to carbohydrate products comprising:
    (a) placing a cathode in an electrolyte together with an anode, wherein said cathode comprises a conductive support substrate and a catalyst coating, said catalyst coating comprising nanoparticles of $Ni_xP_y$, wherein x and y represent integers such that the compounds are selected from the group consisting of $Ni_3P$, $Ni_5P_2$, $Ni_{12}P_5$, $Ni_2P$, $Ni_5P_4$, $NiP_2$, and $NiP_3$;
    (b) placing said anode and cathode in conductive contact with an external source of electricity;
    (c) providing a flowing source of carbon dioxide to said cathode; and (d) using said external source of electricity to drive an electrolysis reaction at said cathode, whereby carbohydrate products are generated from said carbon dioxide.

17. The method of claim 16, wherein said flowing source of carbon dioxide is provided via a flow reactor.

18. The method of claim 16, wherein said carbohydrate product further comprises paraformaldehyde.

* * * * *